US012794728B2

(12) United States Patent
Sharma

(10) Patent No.: US 12,794,728 B2
(45) Date of Patent: Nov. 10, 2026

(54) EMOJI-DRIVEN INTELLIGENT AI SUMMARIES FOR MEETINGS

(71) Applicant: MICROSOFT TECHNOLOGY LICENSING, LLC, Redmond, WA (US)

(72) Inventor: Mrinal Kumar Sharma, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/093,074

(22) Filed: Mar. 27, 2025

(65) Prior Publication Data

US 2026/0303393 A1 Oct. 1, 2026

(51) Int. Cl.

| | |
|---|---|
| ***H04L 12/18*** | (2006.01) |
| ***G06F 16/34*** | (2025.01) |
| ***G06Q 10/109*** | (2023.01) |

(52) U.S. Cl.

CPC ........ *H04L 12/1831* (2013.01); *G06F 16/345* (2019.01); *G06Q 10/109* (2013.01)

(58) Field of Classification Search

CPC .. H04L 12/1831; G06F 16/345; G06Q 10/109
See application file for complete search history.

(56) References Cited

U.S. PATENT DOCUMENTS

| | | | | |
|---|---|---|---|---|
| 11,393,133 | B2 | 7/2022 | El Kaliouby | |
| 2017/0364797 | A1* | 12/2017 | Pal | G06N 3/08 |
| 2020/0073485 | A1* | 3/2020 | Al-Halah | G06N 3/0895 |
| 2020/0296147 | A1* | 9/2020 | Eliason | H04L 65/403 |
| 2025/0028579 | A1* | 1/2025 | Mehmeri | G06F 9/543 |
| 2025/0161812 | A1* | 5/2025 | Kaplan | A63F 13/533 |
| 2025/0219859 | A1* | 7/2025 | Callegari | H04L 12/1822 |
| 2026/0064939 | A1* | 3/2026 | Shernan | G06F 40/134 |

OTHER PUBLICATIONS

"Chat and send emoji reactions in a meeting", Retrieved From: https://www.larksuite.com/hc/en-US/articles/360048487373-chat-and-send-emoji-reactions-in-a-meeting?utm_source=chatgpt.com, Jul. 24, 2025, 24 Pages.

"Dialpad Meetings Emoji Reactions", Retrieved From: https://help.dialpad.com/docs/dialpad-meetings-emoji-reactions?utm_source=chatgpt.com, May 15, 2025, 2 Pages.

Rebelo, Miguel., "The 8 best AI meeting assistants in 2025", Retrieved From: https://zapier.com/blog/best-ai-meeting-assistant/?utm_source=chatgpt.com, Mar. 5, 2025, 29 Pages.

* cited by examiner

*Primary Examiner* — El Hadji M Sall
(74) *Attorney, Agent, or Firm* — Scott Y. Shigeta; Newport IP, LLC

(57) ABSTRACT

The techniques disclosed herein leverage emoji reactions during meetings to dynamically create AI-enhanced summaries that capture both the content and sentiment of the discussion. This approach prioritizes key takeaways, highlights areas needing clarification or action, and tailors insights based on role-specific feedback. By integrating sentiment analysis into meeting summaries, this innovation ensures greater team alignment and actionable outcomes. The described features reimagine the way emoji reactions are leveraged during meetings to create intelligent and actionable AI-generated summaries. By interpreting emojis as real-time indicators of sentiment and engagement, the system dynamically highlights key discussion points, unresolved questions, and areas requiring follow-up.

20 Claims, 8 Drawing Sheets

SCENARIO 1: SENTIMENT CATEGORIZATION

EMOJI-DRIVEN INTELLIGENT AI SUMMARIES FOR MEETINGS

BACKGROUND

In some work environments, especially those adopting Agile methodologies, meetings like sprint planning play a critical role in team alignment and project success. During such meetings, discussions often span multiple features, tasks, and priorities, making it difficult to capture meaningful takeaways and follow-ups. Current meeting tools primarily rely on text transcription or generic automated summaries, which fail to fully encapsulate the sentiment or priorities expressed by participants.

Emoji reactions, a ubiquitous form of expression in digital communication, have yet to be effectively leveraged to enhance meeting outcomes. These reactions provide real-time insights into participant sentiment, ranging from approval ("thumbs up" image) and enthusiasm ("heart" image) to confusion ("furrowed or raised brow" image) or disagreement ("thumbs down" image). However, no existing system integrates these signals dynamically into a tailored, sentiment-driven summary that aligns with team needs and priorities.

SUMMARY

The techniques disclosed herein leverage emoji reactions during meetings to dynamically create AI-enhanced summaries that capture both the content and sentiment of the discussion. This approach prioritizes key takeaways, highlights areas needing clarification or action, and tailors insights based on role-specific feedback. By integrating sentiment analysis into meeting summaries, this innovation ensures greater team alignment and actionable outcomes. The described features reimagine the way emoji reactions are leveraged during meetings to create intelligent and actionable AI-generated summaries. By interpreting emojis as real-time indicators of sentiment and engagement (e.g., a "thumbs up" for agreement, a "furrowed or raised brow" for curiosity or confusion, for a "thumbs down" for dissatisfaction), the system dynamically highlights key discussion points, unresolved questions, and areas requiring follow-up. For example, if multiple "furrowed or raised brow" emojis appear during a feature discussion, the system flags it for clarification, while more than a threshold number of "thumbs up" emojis signal consensus on decisions.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
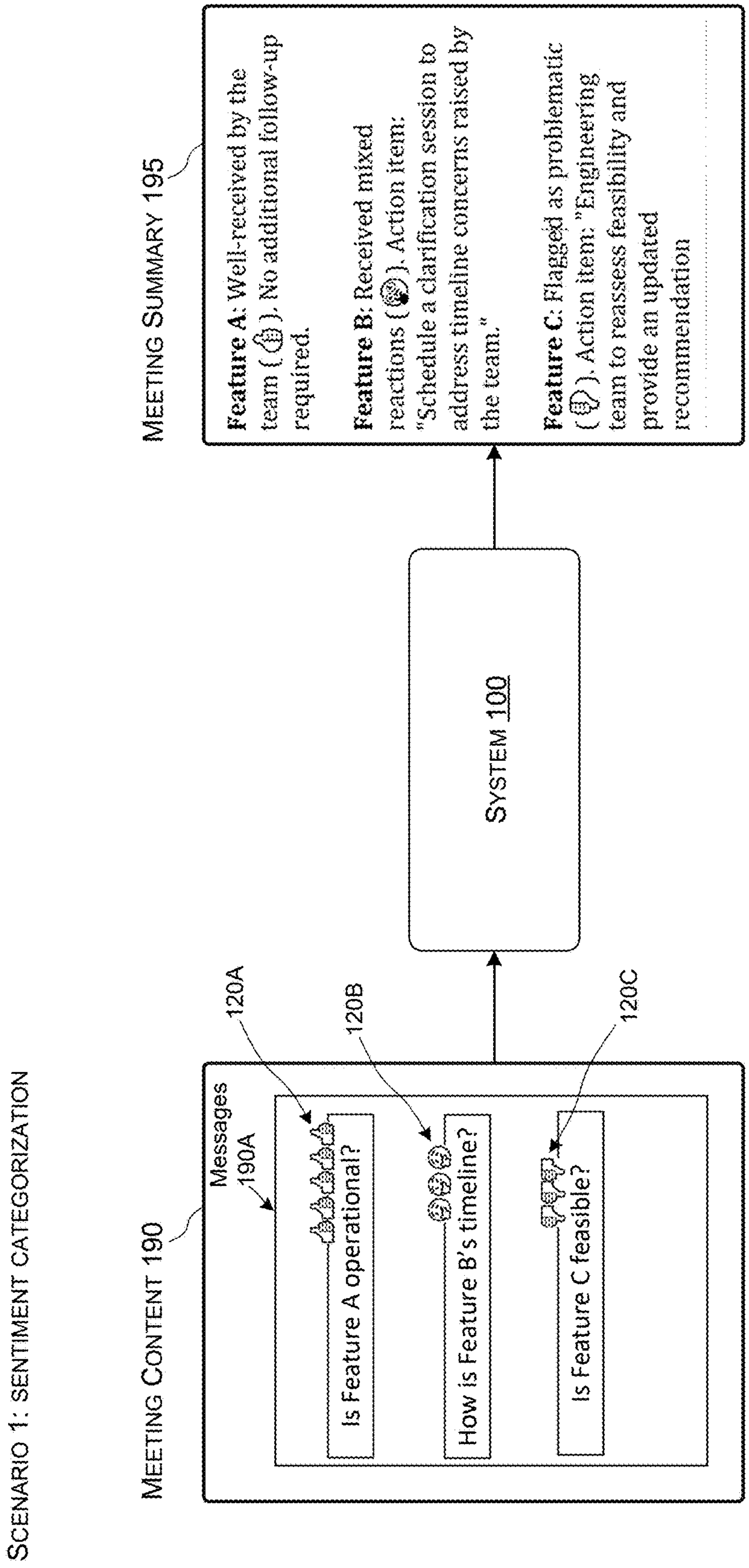
FIG. 1 is a block diagram of a system that leverages emoji reactions for sentiment categorization.

In some work environments, especially those adopting Agile methodologies, meetings like sprint planning play a critical role in team alignment and project success. During such meetings, discussions often span multiple features, tasks, and priorities, making it difficult to capture meaningful takeaways and follow-ups. Current meeting tools primarily rely on text transcription or generic automated summaries, which fail to fully encapsulate the sentiment or priorities expressed by participants.

Emoji reactions, a ubiquitous form of expression in digital communication, have yet to be effectively leveraged to enhance meeting outcomes. These reactions provide real-time insights into participant sentiment, ranging from approval (a "thumbs up" emoji), enthusiasm (a "heart" emoji) to confusion (a face with a "furrowed or raised brow" emoji) or disagreement (a "thumbs down" emoji). However, existing systems do not integrate these signals dynamically into a tailored, sentiment-driven summary that aligns with team needs and priorities.

Although some existing systems may introduce AI-generated meeting summaries, these systems are limited in that they focus solely on objective content (e.g., action items, timelines, key decisions) that are based on meeting transcripts, messages, or other forms of shared text. These summaries do not account for emotional or contextual cues expressed during the meeting, leaving critical feedback and team sentiment unaddressed. As a result, some existing systems often revisit discussions or miss subtle but important cues about team misalignment.

Some existing systems may provide misaligned feedback. For example, during a sprint planning meeting, a team discusses the feasibility of Feature A. While the verbal discussion ends with an agreement to proceed, several participants react with an emoji indicating confusion and an emoji indicating disagreement. From this interaction, and with focus on the verbal discussion, some existing systems may generate a summary indicating, "Feature A was approved for development." Unfortunately, this type of summary misses the underlying dissent. This leads to delays and inefficiencies as the confusion is only discovered during implementation. In addition, if tasks and follow up meetings and assigned roles are generated from this summary, the wrong participants and/or the wrong roles may be assigned to the participants, which may lead to further inefficiencies and possibly unwanted permission settings that are established by the unintended roles.

Some existing systems generate summaries that do not provide a prioritized view of meeting outcomes based on participant feedback. They treat all discussion points equally, failing to emphasize areas that require immediate attention or follow-up. For example, consider a scenario where a team, in a sprint planning meeting, expresses enthusiasm for Feature B with two heart emojis while signaling a confusion emoji around the timeline for Feature C. Some existing systems may generate a conventional summary that treats both items as equally important, failing to highlight Feature C's need for immediate clarification, resulting in missed deadlines and team frustration.

To address some of the above-described issues, the disclosed features leverage emoji reactions during meetings to dynamically create AI-enhanced summaries that capture both the content and sentiment of a discussion. This approach prioritizes key takeaways, highlights areas needing clarification or action, and tailors insights based on role-specific feedback. By integrating sentiment analysis into meeting summaries, this innovation ensures greater team alignment and actionable outcomes. The disclosed techniques reimagine the way emoji reactions are leveraged during meetings to create intelligent and actionable AI-generated summaries. In addition, the disclosed techniques can also improve the security of a system by generating tasks and follow up meetings having accurate roles and permissions for the selected participants. By interpreting emojis as real-time indicators of sentiment and engagement (e.g., a thumbs up emoji for agreement, a furrowed brow emoji for curiosity or confusion, or a thumbs down emoji for dissatisfaction), the system dynamically highlights key discussion points, unresolved questions, and areas requiring follow-up. For example, if multiple furrowed brow emoji emojis appear during a feature discussion, the system flags it for clarification, while thumbs up emoji emojis signal consensus on decisions. Example scenarios using these techniques are shown in FIG. 1 and FIG. 2.

Figure 2:
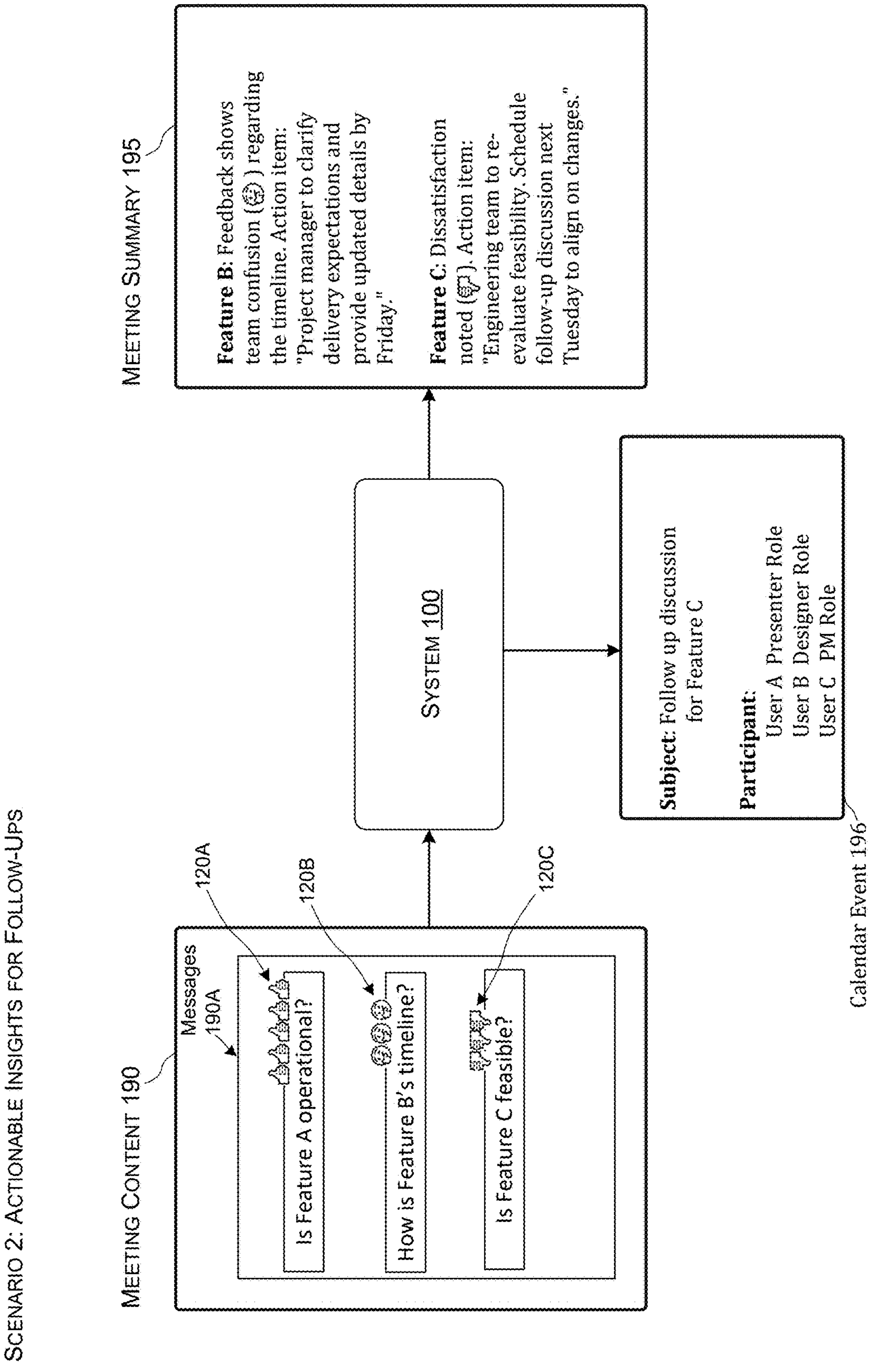
FIG. 2 is a block diagram of a system that generates AI-generated actionable insights for follow-ups.

For illustrative purposes, FIG. 1 shows an example illustrating how the disclosed techniques provide emoji sentiment categorization. In this scenario, during a sprint planning meeting, a team reacts to the following meeting topics. The meeting content 190 includes a chat thread. In this example, the chat participants communicate more than a threshold number of thumbs up emojis 120A (an "approval" sentiment category) in a conversation regarding Feature A. The chat participants communicate more than a threshold number of furrowed brow emojis 120B (a "confusion" sentiment category) in a conversation regarding Feature B. The chat participants communicate more than a threshold number of thumbs down emojis 120C (a "disapproval" sentiment category) in a conversation regarding Feature C.

The threshold can be the same or different for each emoji category, the threshold can be any suitable value, e.g., 1, 2, 3, etc. The threshold can also vary based on a size of an audience or priority of a topic. Higher priority topics can have a lower threshold than lower priority topics. This way, the system can be more sensitive at triggering an action for higher priority topics.

In response to these communicated emojis 120 meeting criteria with respect to a threshold, the system generates a description for a summary 195 indicating that the team has reached a consensus with respect to Feature A. The system also generates a description for the summary indicating that the team has expressed confusion with respect to Feature B, and that further clarification is needed. The system also generates a description for the summary indicating that the team disapproves or flags a problem with respect to Feature C. A threshold number of emojis in this category can cause a system to generate a task, and identify participants to be assigned to that task.

The system can also generate a summary without displaying emojis. For example, the meeting summary 195 can be simplified to a description indicating that: Feature A was discussed and approved, Feature B's timeline was reviewed, Feature C faced challenges in feasibility." As shown in this example, if the system did not account for the emojis, the summary may be incomplete or inaccurate since the text messages do not express a complete picture of the group's sentiment.

Referring now to FIG. 2, the following description shows an example illustrating how the disclosed techniques provide actionable insights for follow-ups. In this scenario, during the same sprint planning meeting, Feature B and Feature C received negative or unclear reactions, but no structured follow-ups were planned. In this embodiment, the system generates a meeting summary with structured follow-ups. The structured follow-ups can be generated by an analysis of all of the meeting content including chat messages, transcripts of live voice streams, emails, and shared files. The analysis can generate specific tasks and timelines based on the meeting content. For example, with respect to Feature A, the system can generate a summary with the follow-up: "Project manager to clarify delivery expectations and provide updated details by Friday." With respect to Feature C, the system can generate a summary with the follow-up: "Engineering team to re-evaluate feasibility. Schedule follow-up discussion next Tuesday to align on changes."

When the team has expressed confusion or disapproval of a topic, the system can also generate a calendar event 196 with the participants that contributed emojis and comments with respect to that specific topic, e.g., Feature B and Feature C. Such a calendar event can also have roles for each participant, which correlate to specific permissions for sharing content, voting, etc. For example, a Designer role may be the only person having permissions to access and edit programming code for the meeting, a presenter role may have exclusive access to presentation materials, etc. A threshold number of emojis in a disapproval category or a confusion can cause a system to generate a follow up meeting with a subset of participants that were engaged in the conversation with respect to that topic. The system can also generate a summary without displaying emojis. For example, the meeting summary 195 can be simplified to a description indicating that: "Feature B's timeline remains under discussion," and "Feature C was reviewed, and feasibility concerns were raised."

Figure 3:
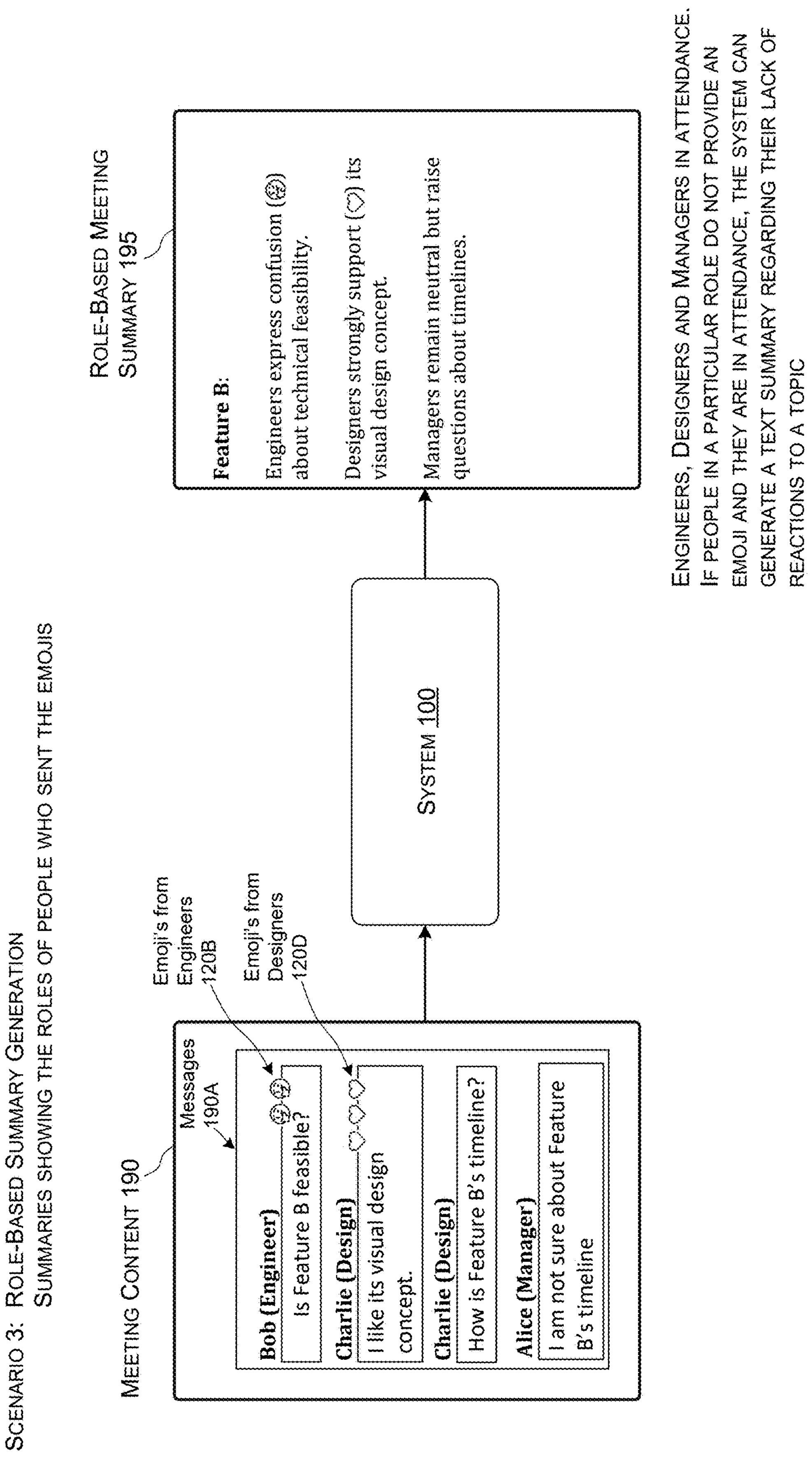
FIG. 3 is a block diagram of a system that is used in a scenario for AI-generated role-based summary generation.

Referring now to FIG. 3, the following description shows an example of an embodiment for role-based summary generation. In this embodiment, the system generates summaries describing the roles of people who sent the emojis. For example, if a person in an Engineering role sent a thumbs up emoji, the system would indicate the agreement is from the Engineering team. In the scenario illustrated in FIG. 3, during the same sprint planning meeting described above, the feedback of Feature B varies across roles. In this meeting, Engineers, Designers and Managers in attendance. The Engineers react to a message pertaining to the feasibility of Feature B with a confusion emoji 120B. The Designers react to a message pertaining to the visual design of Feature B with a heart emoji 120D, and none of the managers provided an emoji response to any of the messages.

In response to receiving a threshold number of confusion emojis 120B from the Engineers, the system generates a summary stating that Engineers express confusion about technical feasibility. In response to receiving a threshold number of heart emojis 120D from the Designers, the system generates a summary stating that Designers strongly support the visual design concept.

If people in a particular role do not provide an emoji and they are in attendance, the system can generate a text summary regarding their lack of reactions to a topic. In this example, the system generates a summary stating that the Managers remain neutral. However, the system also generates a summary of text messages and transcripts of verbal communication, where the summary indicates that the Managers do raise questions about Feature B's timeliness.

Figure 4:
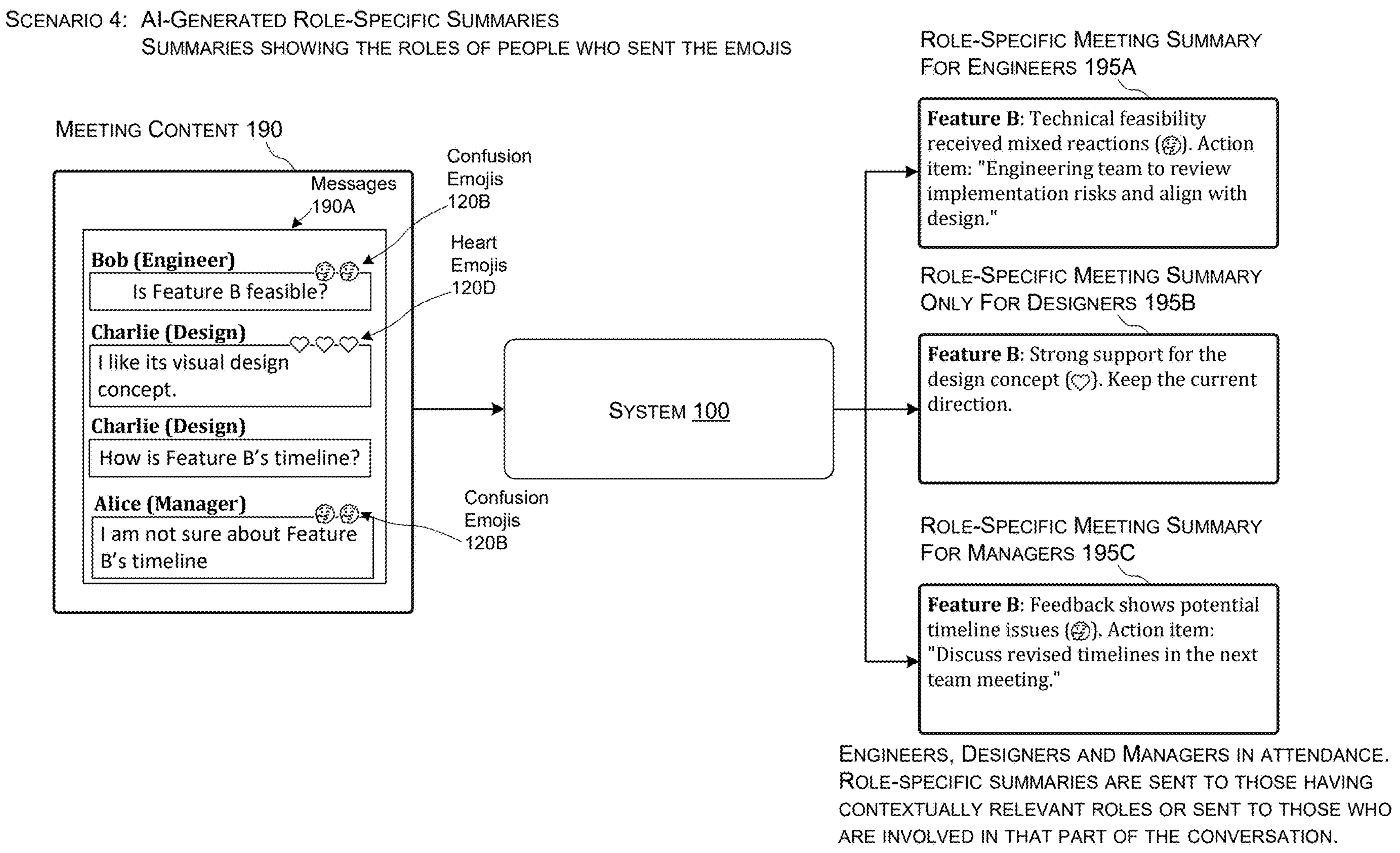
FIG. 4 is a block diagram of a system that is used in a scenario for AI-generated role-specific summaries.

Referring now to FIG. 4, the following description shows an example of role-specific summaries. In example scenario, during the same sprint planning meeting, the feedback of Feature B varies across roles. Similar to the above-described example, Engineers, Designers and Managers are in attendance. The Engineers react to a message pertaining to the feasibility of Feature B with a confusion emoji 120B. The Designers react to a message pertaining to the visual design of Feature B with a heart emoji 120D, and Managers react to a message pertaining to the timeline of Feature B with a confusion emoji 120B.

In response to receiving a threshold number of confusion emojis 120B pertaining to the first topic, e.g., technical feasibility, the system generates a summary for engineers 195A stating that participants express confusion about technical feasibility. The system also generates a description of an action item, stating, "Engineering team to review implementation risks and align with design." The summary for engineers 195A is directed to the people who are associated with a relevant title, such as an Engineering role or title. In some embodiments, the summary for engineers 195A is exclusively sent to the Engineers, since the Engineers are the people who will take action on the described tasks.

In response to receiving a threshold number of heart emojis 120D pertaining to the second topic, e.g., design concept, the system generates a summary for designers 195B confirming support the visual design concept. The summary for designers 195A is directed to the people who are associated with a relevant title, such as a designer role or title. In some embodiments, the summary for designer 195B is exclusively sent to the Designers, since the Designers are the people who will benefit from the message or take action on the described tasks.

In response to receiving a threshold number of confusion emojis 120B pertaining to the second third topic, e.g., project timeline, the system generates a summary for managers 195C stating that participants express confusion about technical feasibility. Similar to the other summaries described above, the summary for the managers is communicated to the users associated with the manager role.

To facilitate the above-described features, the system may first analyze the text of the messages and other forms of communication that I received in conjunction with the messages and determine a topic for those messages. For instance, in the first message, the system may determine that the message is related to the topic of the feasibility of Feature B. The system then associates all of the emojis received from that message and interprets the sentiment communicated by those emojis. Once the sentiment is determined, e.g., an agreement, The sentiment and the topic may be communicated to a large language model, causing the larger image model to generate the text of a summary describing that topic and the sentiment.

The system can also determine a degree associated with a determined sentiment. For instance, if there are more than a first threshold of emojis, e.g., 1, the system can determine that the sentiment is "an agreement." However, if there are more than a second threshold of emojis, e.g., 3 or more, the system can determine that the sentiment is a higher degree and generate a summary stating that there is a "strong agreement."

The system also provides features for real-time execution. The system processes emoji reactions instantly, ensuring real-time updates to meeting summaries without delays. Thus, a new prompt may be sent to an LLM for each new emoji that is received. Summaries are updated and communicated in real time for each new emoji that is received.

In the example of FIG. 4, the system can exclusively deliver the summaries to people with specific roles, or the summaries can be directed to a specific people with specific roles but remain accessible to other users with other roles. The system can generate instructions for the LLM to determine a level of security for a particular takeaway or task in a summary, and if the level of security for a particular takeaway or task in the summary is above a threshold, the system can exclusively deliver the particular takeaway or task to a group of people pertaining to a specific role. The specific role can be selected if a topic of the particular takeaway or task in a summary has a threshold match with a description of a role for the group of users.

Figure 5:
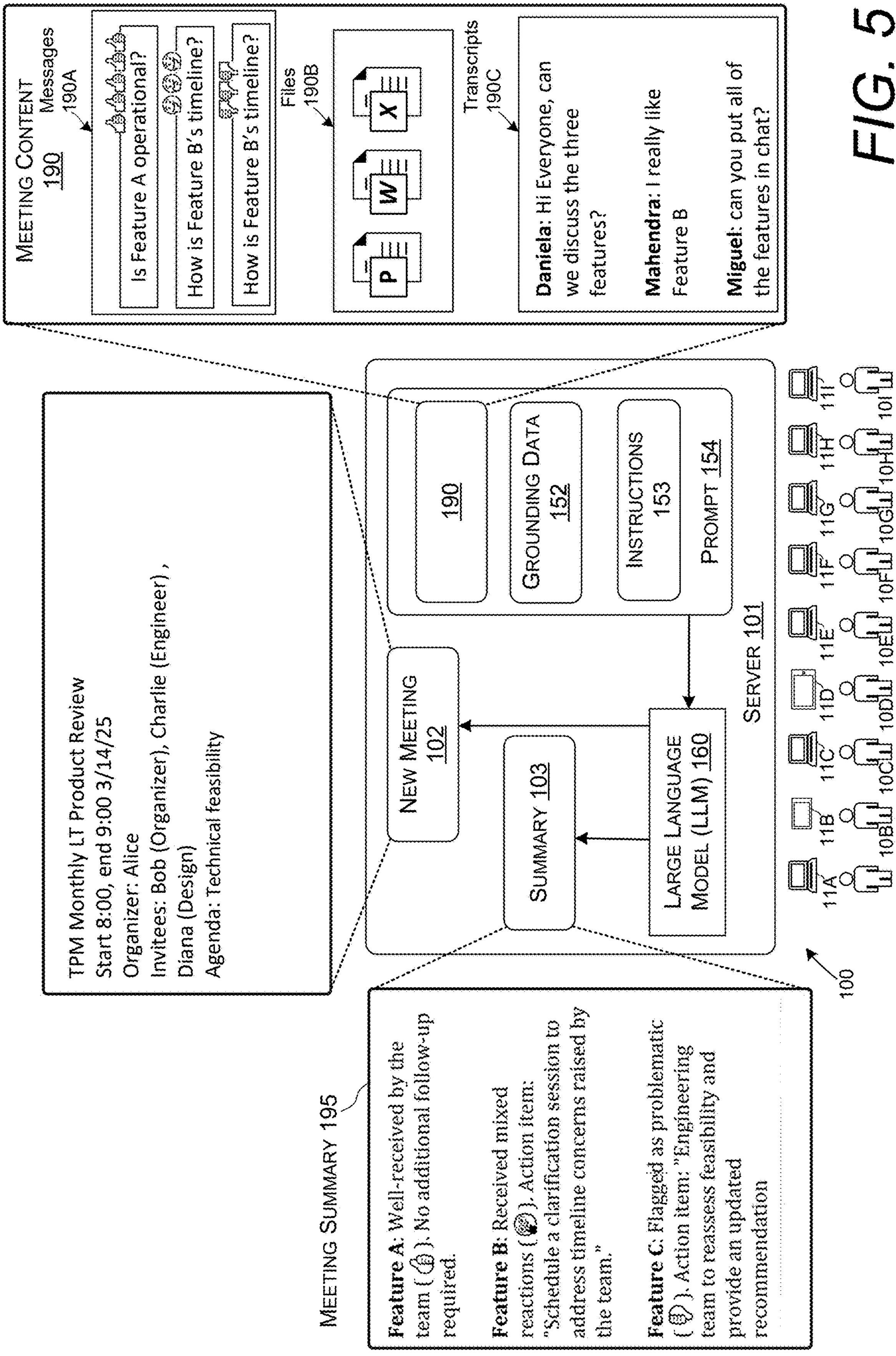
FIG. 5 is a block diagram of a system that leverages emoji reactions during meetings to dynamically create AI-enhanced summaries that capture both the content and sentiment of the discussion.

Referring now to FIG. 5, the following section describes a system for generating a meeting summary 195 based on meeting content 190 comprising text communication and emojis. For illustrative purposes, emojis are also referred to as "expressive illustrations." The system analyzes the meeting content 190, which includes emojis associated with individual messages 190A. The messages can be in a communication thread or comments within a file 190B such as a Word file or a Spreadsheet file. Additional context for generating summaries and tasks can be derived by adding the analysis of transcripts 190C from live communication.

The system can then generate a prompt 154 for a large language model (LLM) 160. The prompt can include grounding data that associates individual expressive illustrations with individual sentiment descriptions. For example, the image or a description of a confusion emoji can be associated with keywords such as "confusion," "needs follow up," etc. The image or a description of a heart emoji can be associated with keywords such as "support," "no need for follow up," etc. The image or a description of a thumbs up emoji can be associated with keywords such as "agreement," "no need for follow up," etc. The image or a description of a thumbs down emoji can be associated with keywords such as "disagreement," "need for follow up," etc. The thumbs down can also be associated with instructions for causing an LLM to generate a task or a calendar event for a follow-up meeting.

The prompt 154 can also include the meeting content 190 comprising text that is derived from messages communicated between the plurality of participants, voice communication between the plurality of participants, and files shared between the plurality of participants. The prompt can also include instructions 153 for causing the LLM to process the meeting content and the grounding data 152 that has the sentiment descriptions to generate the meeting summary 195.

The instructions can cause the LLM to identify a topic from each message, e.g., the delivery schedule of Feature A, or the feasibility of Feature A, and associate each topic with a summary of the sentiment descriptions, e.g., "there is strong agreement for the feasibility of Feature A." Where the summary of the sentiment description is "there is strong agreement" and the topic is the "feasibility of Feature A."

The system can then send the prompt to the LLM. This can involve communicating the prompt to the LLM, which in turn causes the LLM to generate a meeting summary describing the one or more topics of the meeting content and a summary of one or more individual sentiment descriptions that is based on the number of occurrences of individual categories of the expressive illustrations. The prompt further causing the LLM to generate the description associating the one or more topics with the summary of one or more individual sentiment descriptions.

The LLM then generates the contextually relevant summary that interprets both the text and emojis that are communicated in a message thread. In this process, the LLM generates the meeting summary describing one or more topics of the meeting content and a summary of one or more individual sentiment descriptions. In some embodiments, the summary of one or more individual sentiment descriptions can be characterized by a number of occurrences of individual categories of the expressive illustrations. For example, a higher number of thumbs up emojis for a topic can cause the system to generate language that emphasizes that sentiment. The instructions cause the LLM to generate a description associating the one or more topics with the summary of one or more individual sentiment descriptions (associate the topic with the emoji summary, e.g., Feature A is well-received).

The system can then receive the summary 195 describing the one or more topics of the meeting content and the summary of one or more individual sentiment descriptions. The system can then display the summary 195 to each participant. As described above, the system can also send individual summaries based on roles. The system can also generate a meeting of a subset of participants based on the number of occurrences of individual categories of the expressive illustrations exceeding a threshold. The subset of participants are each assigned permissions based on a topic associated with one or more individual sentiment descriptions. For illustrative purposes, a category of an expressive illustration can include one or more specific emojis. For example, a support category can include a heart emoji, a smiley face emoji, etc. An agreement category can include any emoji that has a variation of a thumbs up or OK hand gesture.

Figure 6:
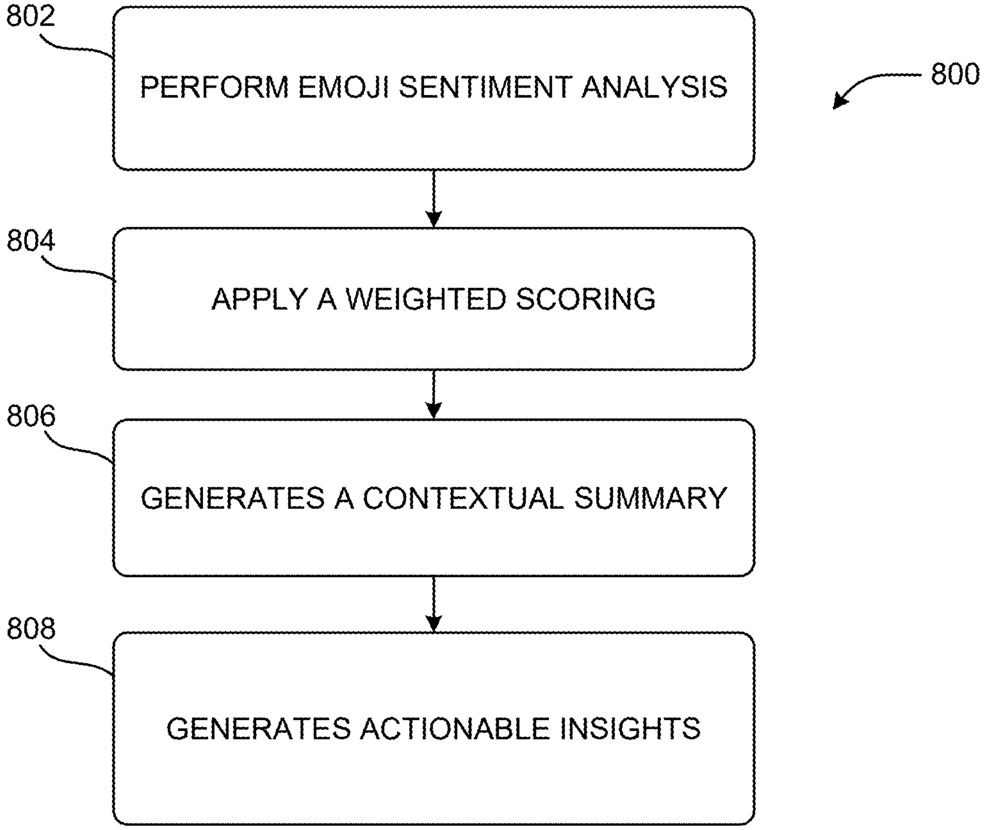
FIG. 6 is a flow diagram showing aspects of a routine for implementing aspects of the disclosed techniques.

Turning now to FIG. 6, the following section describes aspects of a routine 800 for implementing aspects of the disclosed techniques. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an Natural Language Processing (NLP) algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the state of any device may be used in operations described herein.

The routine 800 starts at operation 802, where the system performs an emoji sentiment analysis. In this operation, the system causes an AI model, e.g., such as an LLM, to process the reactions (e.g., a thumbs up emoji, a thumbs down emoji, heart emoji, etc.) during a meeting, categorizing them into sentiment types or categories, e.g., example categories including "liked," "loved," "confused," and "disliked." As a result of this analysis, the system captures the emotional context of the discussion, allowing the AI to gauge team reactions.

At operation 804, the system applies a weighted scoring. In this operation, the AI assigns weighted scores to meeting sections based on the frequency and type of emoji reactions. For example, three heart emojis denote strong agreement, two furrowed brow emojis signals confusion, and two thumbs down emojis show dissatisfaction. The weighted scoring can be based on a number of received emojis in each category. This operation enables prioritization of meeting topics based on the team's emotional feedback. For example, if 5 thumbs up emojis are received for a first topic, e.g., Feasibility of Feature A, and 2 thumbs up emojis are received for a second topic, e.g., the timeline of Feature B, the first topic would have priority over the second topic in addition to each topic having an associated sentiment.

At operation 806, the system generates a contextual summary. In operation 806, the system combines the sentiment analysis and meeting content to generate summaries that reflect both the key discussion points and emotional insights. This can be performed by sending the meeting content with the results of the sentiment analysis to an LLM with instructions to generate a summary. The sentiment analysis can result in a data structure that can be used as grounding data, where the grounding data associates a count of a number of times an expression category (all heart emojis or all agreement emojis) appears for a particular topic. This operation provides actionable and personalized summaries, highlighting consensus, disagreements, and areas needing clarification.

At operation 810, the system generates actionable Insights. In this operation, the system enables an AI model to identify topics requiring follow-up or further discussion based on sentiment analysis and assigns tasks automatically (e.g., scheduling clarification sessions or assigning rework). The meeting content and the grounding data can be sent to an LLM with instructions to generate the actional insights. For example, grounding data can indicate that there are five reactions for a disagreement on a first topic, and two reactions for an agreement on the same topic. The instructions in the query can indicate that if there are more disagreements than agreements for a topic, or that there are more than a threshold number of disagreements, then the system can generate an actionable insight. An actionable insight can be generated by providing an instruction to interpret meeting content to generate an action based on a particular topic, e.g., generate a task for all detected comments pertaining to the timeline of Feature B. The instruction can be sent to the LLM with the meeting content, causing the LLM to generate one or more actionable insights for a particular topic. This operation drives post-meeting actions to resolve issues and maintain momentum.

Operation 808 can also include the generation of a meeting as an actionable insight. The meeting can invite anyone who was involved in communicating on a thread regarding a particular topic, and the meeting can be invoked with the number of emojis in a predetermined category, e.g., disagreement, exceeds a threshold. Based on the context of a transcript of the vocal communication and the messages of a chat, the system can cause the LLM to generate a meeting invitation that assigns roles to people who contributed to the conversation. If a person is mentioned in a chat as having skills as a UX designer and that comment has a threshold number of emojis (graphical expressions) in a specific emoji category, e.g., approvals, the system grants that person with permissions in the next meeting to access the programming code, while other people who are invited to the meeting are restricted from accessing the code but have access to presentation documents, e.g., for presenter roles. The system can also include role-based tailoring. The system links emoji reactions to participants' roles (e.g., engineers, designers, managers) and creates role-specific insights, as shown in FIGS. 4 and 5.

Operation 808 can include selecting a subset of participants from the plurality of participants of the first meeting, the subset of participants selected in response to a detection of a threshold quantity of text or expressive illustrations communicated from the subset of participants. These operations also include generating a second meeting of the subset of participants in response to the number of occurrences of individual categories of the expressive illustrations exceeding a threshold, wherein the subset of participants are assigned permissions based on a context of communication for a topic associated with one or more individual sentiment description (e.g., the UX Designer having a threshold number of emojis on a comment suggesting their role in a second meeting), wherein the assigned permissions provide access to a first category of data (the code) for a first set of participants having a first role (UX Designer), the permissions restricting access to the first category of data for a set of participants having a second role (e.g., a person who was suggested in a message of having a role as a note taker and receiving confirmation of that role with a threshold number of emojis indicating an approval. In the above example, if yet another person is suggested as having a UX Designer role in a chat, and that message receives a threshold number of emojis indicating a disapproval (thumbs down), (or if that message does not have the threshold number of approval emojis, that person is not granted the role as UX Designer and that person is also restricted from accessing the data. This improved control of permissions and access control improves the security of the system by the use of emojis applied to specific message that suggest roles and specific permissions for such roles. This is an improvement over systems that only rely on comments to suggest roles and specific permissions alone since it requires confirmation from multiple participants who also have a threshold permission level, e.g., they were invited and approved to participate in the chat thread.

Although the examples described herein refer to the use of a large language model, the techniques disclosed herein can utilize any combination of suitable Natural Language Processing (NLP) algorithms that analyze and model interactions between devices and human language. This can include, but is not limited to, any suitable combination of algorithms such as Tokenization algorithms that divide a text into individual words or tokens; Part-of-Speech (POS) Tagging algorithms that assign grammatical labels (e.g., noun, verb, adjective) to each word in a sentence, helping to analyze sentence structure; Named Entity Recognition (NER) algorithms that identify and classify named entities, such as names of people, places, organizations, and more within a text; Sentiment Analysis algorithms that determine the sentiment or emotional tone of a piece of text, and classifying it as positive, negative, or neutral; Text Classification algorithms that categorize text documents into predefined classes or categories, such as topic classification and sentiment analysis; Machine Translation algorithms, like neural machine translation (NMT), automatically translate text from one language to another; Language Modeling algorithms, including n-grams and neural language models, an also to referred to herein as a large language model (LLM) or a "language model," are used to predict the probability of a word or sequence of words given the context of the preceding words; Named Entity Disambiguation algorithms which help disambiguate the meaning of named entities by linking them to specific entities in a knowledge base or resolving them to their appropriate entities; Text Summarization algorithms that generate concise summaries of longer texts, which can be extractive (selecting and combining sentences) or abstractive (generating new sentences); Speech Recognition algorithms, since the system may process speech messages and not just text messages; Information Extraction algorithms that identify structured information from unstructured text, for extracting events or facts from articles or message attachments; Coreference Resolution algorithms that determine which words or phrases in a text refer to the same entity, e.g., identifying that "he" and "John" refer to the same person in a sentence; Question Answering algorithms that answer questions posed in natural language by extracting relevant information from text corpora or knowledge bases; Word Embeddings algorithms that represent words as dense, continuous-valued vectors, which capture semantic relationships between words; Text Generation algorithms that use Recurrent Neural Networks (RNNs) and Transformers to create human-like text, including chatbots, content generation, and creative writing, Dependency Parsing algorithms that analyze the grammatical structure of sentences by identifying the relationships between words, including subjects, objects, and modifiers; Topic Modeling algorithms, such as Latent Dirichlet Allocation (LDA), to uncover the underlying topics in a collection of documents; and Language Generation algorithms that create coherent and contextually relevant language, such as generating human-like responses in a conversational AI system. In some embodiments, the system can also utilize audio-to-audio models, where audio files or audio streams are communicated to the model with a prompt for causing the models to generate the responses described herein.

Figure 7:
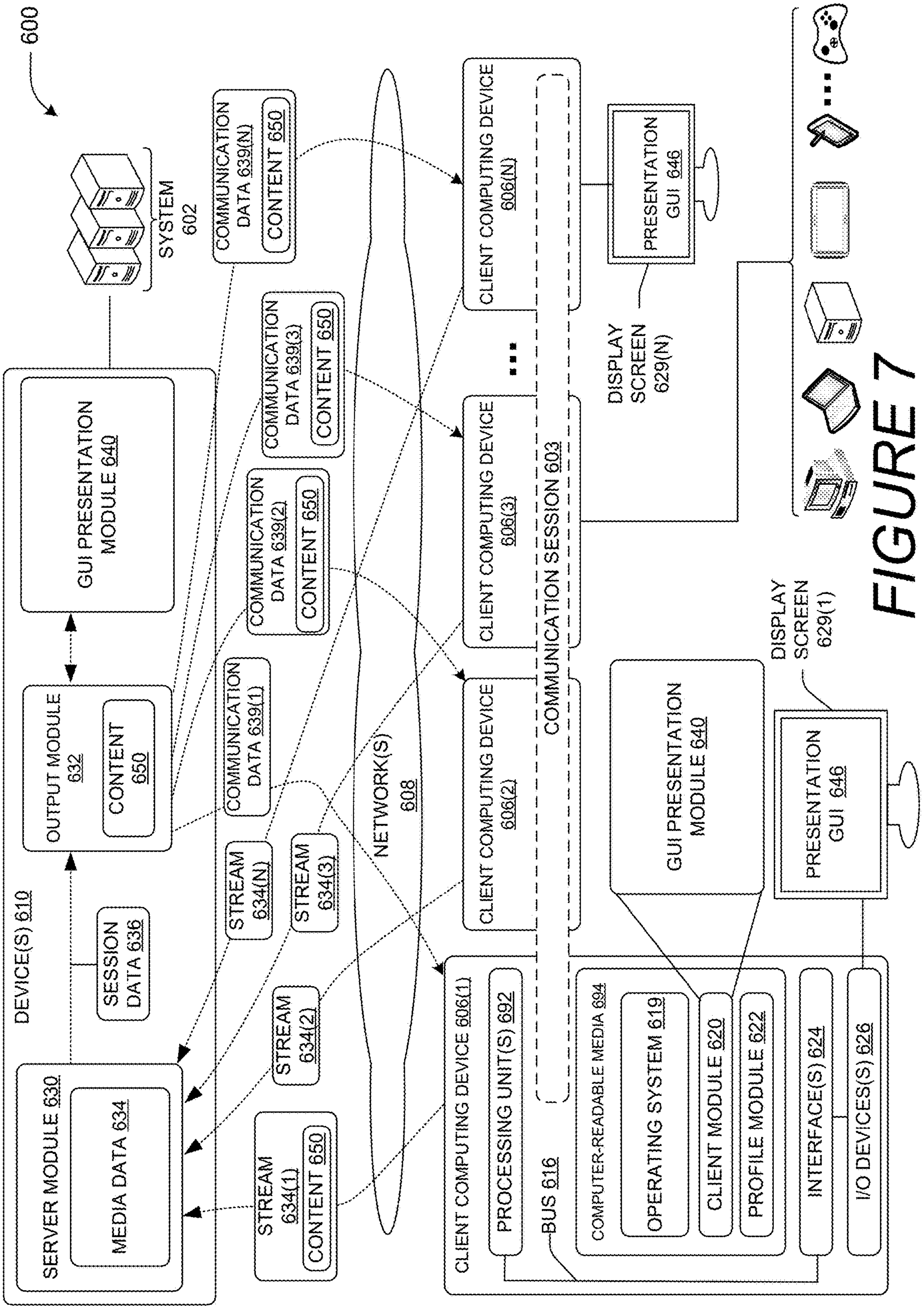
FIG. 7 is a diagram illustrating a distributed computing environment capable of implementing aspects of the techniques and technologies presented herein.

Turning now to FIG. 7, a diagram illustrating an example environment 600 in which a system 602 can implement the disclosed techniques is shown. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603. A communication session 603 can include a call, which can be a direct call from a person to others, a communication session 603 can also include a meeting, which is an appointment that is established by a calendar event defining attendees.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 7 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11 g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a vocal input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 7 illustrates that client computing device 606(1) is in some way connected to a display device (e.g., a display screen 629(N)), which can display a UI according to the techniques described herein.

In the example environment 600 of FIG. 7, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 7) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 8:
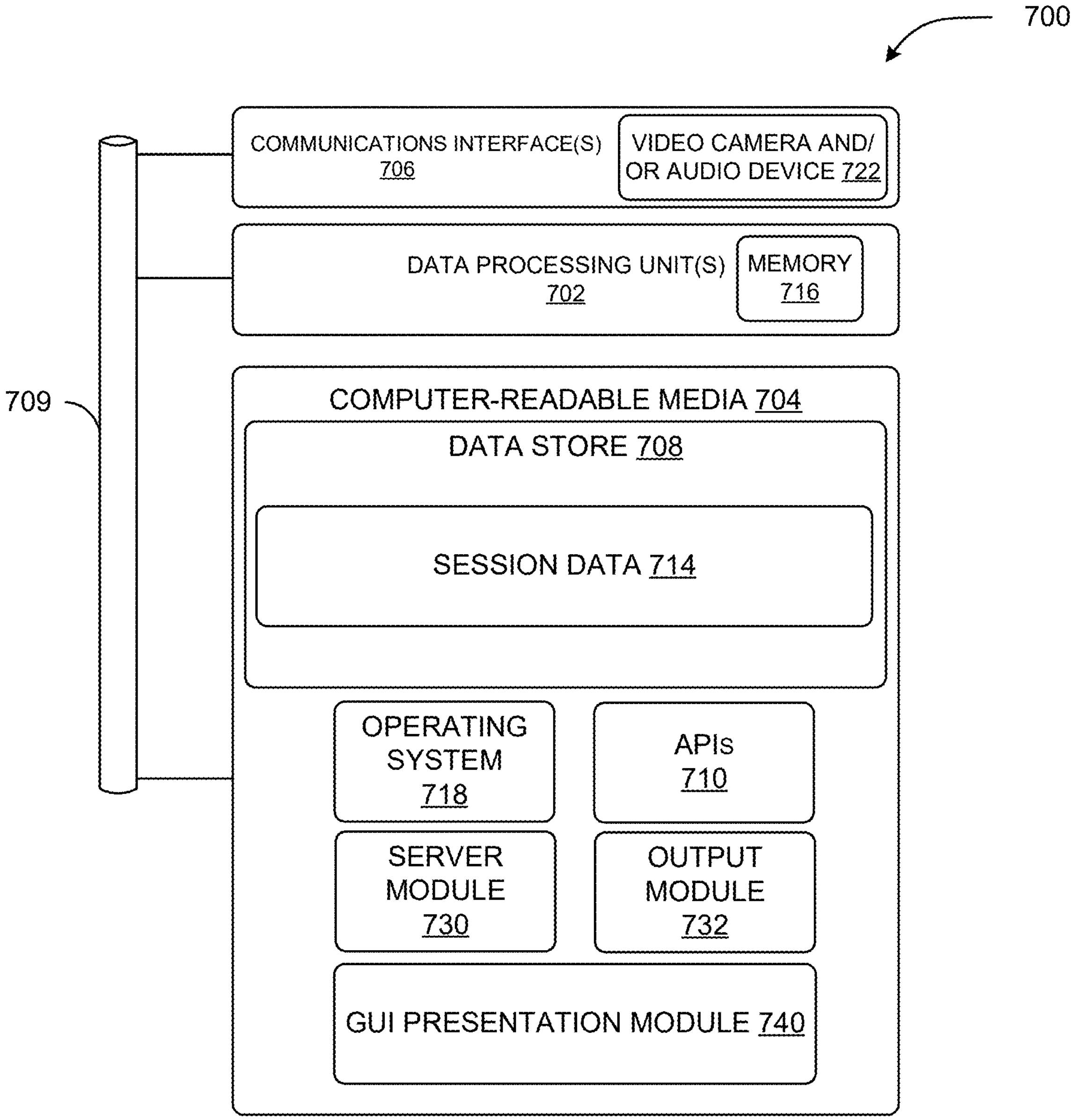
FIG. 8 is a computer architecture diagram illustrating a computing device architecture for a computing device capable of implementing aspects of the techniques and technologies presented herein.

FIG. 8 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein.

Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which is also referred to herein as computer-readable storage media, a computer-readable medium, or computer-readable storage medium, includes one or more of volatile memory, nonvolatile memory, and/or other persistent and/or auxiliary computer storage media, rotating storage medium such as a disk, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

A "computer-readable storage device" or a "computer-readable device" includes non-transitory computer-readable storage media such as one or more of volatile memory, nonvolatile memory implemented in any method or technology for storage of information such as computer-readable instructions, data structures, program modules, or other data. Thus, a computer-readable storage device includes tangible and/or physical forms of a hardware component that is part of a computing system or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), or flash memory, solid-state memory devices, storage arrays, network attached storage, storage area networks. The computer-readable storage device also includes a physical hardware device having circuitry and magnetic sensors, optical sensors, or other sensors for reading a compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, or any other physical locally stored medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store the primary calendar and secondary calendar, and other session data that show the status and activity level of each user. The session data can include a total number of participants (e.g., users and/or client computing devices) in a communication session, activity that occurs in the communication session, a list of invitees to the communication session, and/or other data related to when and how the communication session is conducted or hosted. The data store 708 may also include session data 714, such as the meeting objects described herein. The session data 714 can also include video, audio, or other content that can be shared in a meeting. The session data can also include permissions for each user. For example, session data can indicate that past meetings included users having speaker roles and other roles. This data can also indicate preferences, e.g., that a user wants to join meetings with RTT activated for each meeting or only certain events having attributes that meet one more criteria, e.g., with predetermined invitees or meetings having shared content having a predetermined subject. The permissions can define specific instructions that are permitted and restricted during different states of a meeting or call that is in progress. For example, based on a role in a meeting, e.g., organizer or administrator, some users may have permissions to start or stop the RTT mode in a meeting, while others are restricted from such operations.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

I claim:

1. A computer-implemented method for generating a meeting summary based on meeting content comprising text communication and expressive illustrations, the computer-implemented method for execution on a system, the computer-implemented method comprising:

receiving the meeting content that is communicated between a plurality of participants of a meeting, the meeting content comprising expressive illustrations each communicated from individual participants of the meeting, the meeting content further comprising sections of text derived from messages communicated between the plurality of participants and comments within files shared between the plurality of participants, wherein the expressive illustrations are each associated with at least one section of text;

generating a prompt comprising:

grounding data that associates individual expressive illustrations with individual sentiment descriptions, wherein an individual class of the expressive illustrations is associated with an individual sentiment description, meeting content comprising the sections of text derived from messages communicated between the plurality of participants and the comments within the files shared between the plurality of participants, and data defining an association between each of the expressive illustrations and at least one section of text, wherein each section of text is associated with at least one message or at least one at least one comment, and instructions for causing a Large Language Model (LLM) to generate a meeting summary describing one or more topics of the meeting content and a summary of one or more individual sentiment descriptions associated with the one or more topics, the summary describing the one or more individual sentiment descriptions characterized by a number of occurrences of individual categories of the expressive illustrations, wherein the instructions are further configured to cause the LLM to generate a description associating the one or more topics with the summary of one or more individual sentiment descriptions;

communicating the prompt to the LLM causing the LLM to generate the meeting summary describing the one or more topics of the meeting content and the summary of one or more individual sentiment descriptions that is based on the number of occurrences of individual categories of the expressive illustrations, the prompt further causing the LLM to generate the description associating the one or more topics with the summary of one or more individual sentiment descriptions;

receiving the meeting summary describing the one or more topics of the meeting content and the summary of one or more individual sentiment descriptions; and causing a display of the meeting summary describing the one or more topics of the meeting content and the summary of one or more individual sentiment descriptions, wherein the meeting summary also includes the description associating the one or more topics with the summary of one or more individual sentiment descriptions.

2. The computer-implemented method of claim 1, wherein the meeting is a first meeting, wherein the method further comprises:

selecting a subset of participants from the plurality of participants of the first meeting, the subset of participants selected in response to a detection of a threshold quantity of text or expressive illustrations communicated from the subset of participants; and generating a second meeting of the subset of participants in response to the number of occurrences of individual categories of the expressive illustrations exceeding a threshold, wherein the subset of participants are assigned permissions based on a context of communication for a topic associated with one or more individual sentiment descriptions, wherein the assigned permissions provide access to a first category of data for a first set of participants having a first role, the permissions restricting access to the first category of data for a set of participants having a second role.

3. The computer-implemented method of claim 1, wherein the method further comprises:

determining that the number of occurrences of individual categories of the expressive illustrations exceeds a threshold; and in response to determining that the number of occurrences of individual categories of the expressive illustrations exceeds the threshold, generating additional instructions for causing the LLM to:

identify a task based on an analysis of the meeting content, select a subset of participants from the plurality of participants of the first meeting, the subset of participants selected in response to a detection of a threshold match between a role of the subset of participants and requirements of the task identified from the meeting content, generate an actionable insight describing the task identified from the meeting content, wherein the task is assigned to the subset of participants, and integrate the actionable insight into the meeting summary.

4. The computer-implemented method of claim 1, wherein the meeting is a first meeting, wherein the method further comprises:

identifying a role associated with a user that initiated a display of at least one expressive illustration associated with a topic derived from the meeting content;

providing an additional instruction for the LLM to identify the role of the user that caused communication of the at least one expressive illustration for the topic;

communicating the additional instruction to the LLM causing the LLM to include the role of the user that caused communication of the at least one expressive illustration for the topic in the meeting summary.

5. The computer-implemented method of claim 1, wherein the method further comprises:

generating additional instructions for causing the LLM to:

select a subset of participants from the plurality of participants of the meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

including the task description or a description of expressive illustrations received in association with the meeting content describing the topic in an individual meeting summary; and communicating the individual meeting summary to the subset of participants associated with the role.

6. The computer-implemented method of claim 1, wherein the method further comprises:

generating additional instructions for causing the LLM to:

select a subset of participants from the plurality of participants of the meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

including the task description or a description of expressive illustrations received in association with the meeting content describing the topic in an individual meeting summary;

configuring permissions for the subset of participants to access the individual meeting summary; and communicating the individual meeting summary to the subset of participants associated with the role based on the permissions, while using the permissions to restrict other participants of the plurality of participants from accessing the individual meeting summary.

7. The computer-implemented method of claim 1, wherein the method further comprises:

providing historical meeting data indicating work experiences related to a role for each participant of the meeting; and training the LLM using the historical meeting data indicating work experience related to the role for each participant, wherein weights of the LLM are adjusted to generate an association between previously performed tasks and roles for each of the participants, wherein the instructions of the prompt further cause the LLM to utilize the historical meeting data in generating the meeting summary and a calendar event of a subset of the plurality of participants assigned to the calendar event, wherein the calendar event is assigned permissions for each participant based on roles assigned to each participant, the assignment of the roles and permissions having an accuracy based on the historical meeting data used to train the LLM.

8. A computing system for generating a meeting summary based on meeting content comprising text communication and expressive illustrations, the computing system comprising:

one or more processing units; and a computer-readable storage medium having encoded thereon computer-executable instructions to cause the one or more processing units to:

receive the meeting content that is communicated between a plurality of participants of a meeting, the meeting content comprising expressive illustrations each communicated from individual participants of the meeting, the meeting content further comprising sections of text that is derived from messages communicated between the plurality of participants and comments within files shared between the plurality of participants, wherein the expressive illustrations are each associated with at least one section of text;

generate a prompt comprising:

grounding data that associates individual expressive illustrations with individual sentiment descriptions, wherein an individual class of the expressive illustrations is associated with an individual sentiment description, meeting content comprising the sections of text derived from messages communicated between the plurality of participants and the comments within the files shared between the plurality of participants, and data defining an association between each of the expressive illustrations and at least one section of text, wherein each section of text is associated with at least one message or at least one comment, and instructions for causing a Large Language Model (LLM) to generate a meeting summary describing one or more topics of the meeting content and a summary of one or more individual sentiment descriptions associated with the one or more topics, the summary describing the one or more individual sentiment descriptions characterized by a number of occurrences of individual categories of the expressive illustrations, wherein the instructions are further configured to cause the LLM to generate a description associating the one or more topics with the summary of one or more individual sentiment descriptions;

communicate of the prompt to the LLM causing the LLM to generate the meeting summary describing the one or more topics of the meeting content and the summary of one or more individual sentiment descriptions that is based on the number of occurrences of individual categories of the expressive illustrations, the prompt further causing the LLM to generate the description associating the one or more topics with the summary of one or more individual sentiment descriptions;

receive the meeting summary describing the one or more topics of the meeting content and the summary of one or more individual sentiment descriptions; and cause a display of the meeting summary describing the one or more topics of the meeting content and the summary of one or more individual sentiment descriptions, wherein the meeting summary also includes the description associating the one or more topics with the summary of one or more individual sentiment descriptions.

9. The computing system of claim 8, wherein the meeting is a first meeting, wherein the computer-executable instructions further cause the one or more processing units to:

select a subset of participants from the plurality of participants of the first meeting, the subset of participants selected in response to a detection of a threshold quantity of text or expressive illustrations communicated from the subset of participants; and generate a second meeting of the subset of participants in response to the number of occurrences of individual categories of the expressive illustrations exceeding a threshold, wherein the subset of participants are assigned permissions based on a context of communication for a topic associated with one or more individual sentiment descriptions, wherein the assigned permissions provide access to a first category of data for a first set of participants having a first role, the permissions restricting access to the first category of data for a set of participants having a second role.

10. The computing system of claim 8, wherein the computer-executable instructions further cause the one or more processing units to:

determine that the number of occurrences of individual categories of the expressive illustrations exceeds a threshold; and in response to determining that the number of occurrences of individual categories of the expressive illustrations exceeds the threshold, generate additional instructions for causing the LLM to:

identify a task based on an analysis of the meeting content, select a subset of participants from the plurality of participants of the first meeting, the subset of participants selected in response to a detection of a threshold match between a role of the subset of participants and requirements of the task identified from the meeting content, generate an actionable insight describing the task identified from the meeting content, wherein the task is assigned to the subset of participants, and integrate the actionable insight into the meeting summary.

11. The computing system of claim 8, wherein the meeting is a first meeting, wherein the computer-executable instructions further cause the one or more processing units to:

identify a role associated with a user that initiated a display of at least one expressive illustration associated with a topic derived from the meeting content;

provide an additional instruction for the LLM to identify the role of the user that caused communication of the at least one expressive illustration for the topic; and communicate the additional instruction to the LLM causing the LLM to include the role of the user that caused communication of the at least one expressive illustration for the topic in the meeting summary.

12. The computing system of claim 8, wherein the computer-executable instructions further cause the one or more processing units to:

generate additional instructions for causing the LLM to:

select a subset of participants from the plurality of participants of the meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

include the task description or a description of expressive illustrations received in association with the meeting content describing the topic in an individual meeting summary; and communicate the individual meeting summary to the subset of participants associated with the role.

13. The computing system of claim 8, wherein the computer-executable instructions further cause the one or more processing units to:

generate additional instructions for causing the LLM to:

select a subset of participants from the plurality of participants of the meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

include the task description or a description of expressive illustrations received in association with the meeting content describing the topic in an individual meeting summary;

configure permissions for the subset of participants to access the individual meeting summary; and communicate the individual meeting summary to the subset of participants associated with the role, while restricting other participants of the plurality of participants from accessing the individual meeting summary.

14. The computing system of claim 8, wherein the computer-executable instructions further cause the one or more processing units to:

provide historical meeting data indicating work experiences related to a role for each participant of the meeting; and train the LLM using the historical meeting data indicating work experience related to the role for each participant, wherein weights of the LLM are adjusted to generate an association between previously performed tasks and roles for each of the participants, wherein the instructions of the prompt further cause the LLM to utilize the historical meeting data in generating the meeting summary and a calendar event of a subset of the plurality of participants assigned to the plurality of calendar event, wherein the calendar event is assigned permissions for each participant based on roles assigned to each participant, the assignment of the roles and permissions having an accuracy based on the historical meeting data used to train the LLM.

15. A computer-readable storage medium having encoded thereon computer-executable instructions for generating a meeting summary based on meeting content comprising text communication and expressive illustrations, the computer-executable instructions configured to cause one or more processing units of a computing system to:

receive the meeting content that is communicated between a plurality of participants of a meeting, the meeting content comprising expressive illustrations each communicated from individual participants of the meeting, the meeting content further comprising sections of text derived from messages communicated between the plurality of participants and comments within files shared between the plurality of participants, wherein the expressive illustrations are each associated with at least one section of text;

generate a prompt comprising:

grounding data that associates individual expressive illustrations with individual sentiment descriptions, wherein an individual class of the expressive illustrations is associated with an individual sentiment description, meeting content comprising the sections of text derived from messages communicated between the plurality of participants and the comments within the files shared between the plurality of participants, and data defining an association between each of the expressive illustrations and at least one section of text, wherein each section of text is associated with at least one message or at least one comment, and instructions for causing a Large Language Model (LLM) to generate a meeting summary describing one or more topics of the meeting content and a summary of one or more individual sentiment descriptions associated with the one or more topics, the summary describing the one or more individual sentiment descriptions characterized by a number of occurrences of individual categories of the expressive illustrations, wherein the instructions are further configured to cause the LLM to generate a description associating the one or more topics with the summary of one or more individual sentiment descriptions;

communicate the prompt to the LLM causing the LLM to generate the meeting summary describing the one or more topics of the meeting content and the summary of one or more individual sentiment descriptions that is based on the number of occurrences of individual categories of the expressive illustrations, the prompt further causing the LLM to generate the description associating the one or more topics with the summary of one or more individual sentiment descriptions;

receive the meeting summary describing the one or more topics of the meeting content and the summary of one or more individual sentiment descriptions; and cause a display of the meeting summary describing the one or more topics of the meeting content and the summary of one or more individual sentiment descriptions, wherein the meeting summary also includes the description associating the one or more topics with the summary of one or more individual sentiment descriptions.

16. The computer-readable storage medium of claim 15, wherein the meeting is a first meeting, wherein the computer-executable instructions further cause the one or more processing units to:

select a subset of participants from the plurality of participants of the first meeting, the subset of participants selected in response to a detection of a threshold quantity of text or expressive illustrations communicated from the subset of participants; and generate a second meeting of the subset of participants in response to the number of occurrences of individual categories of the expressive illustrations exceeding a threshold, wherein the subset of participants are assigned permissions based on a context of communication for a topic associated with one or more individual sentiment descriptions, wherein the assigned permissions provide access to a first category of data for a first set of participants having a first role, the permissions restricting access to the first category of data for a set of participants having a second role.

17. The computer-readable storage medium of claim 15, wherein the computer-executable instructions further cause the one or more processing units to:

determine that a number of occurrences of individual categories of the expressive illustrations exceeds a threshold; and in response to determining that the number of occurrences of individual categories of the expressive illustrations exceeds the threshold, generate additional instructions for causing the LLM to:

identify a task based on an analysis of the meeting content, select a subset of participants from the plurality of participants of the first meeting, the subset of participants selected in response to a detection of a threshold match between a role of the subset of participants and requirements of the task identified from the meeting content, generate an actionable insight describing the task identified from the meeting content, wherein the task is assigned to the subset of participants, and integrate the actionable insight into the meeting summary.

18. The computer-readable storage medium of claim 15, wherein the meeting is a first meeting, wherein the computer-executable instructions further cause the one or more processing units to:

identify a role associated with a user that initiated a display of at least one expressive illustration associated with a topic derived from the meeting content;

provide an additional instruction for the LLM to identify the role of the user that caused communication of the at least one expressive illustration for the topic; and communicate the additional instruction to the LLM causing the LLM to include the role of the user that caused communication of the at least one expressive illustration for the topic in the meeting summary.

19. The computer-readable storage medium of claim 15, wherein the computer-executable instructions further cause the one or more processing units to:

generate additional instructions for causing the LLM to:

select a subset of participants from the plurality of participants of the meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

include the task description or a description of expressive illustrations received in association with the meeting content describing the topic in an individual meeting summary; and communicate the individual meeting summary to the subset of participants associated with the role.

20. The computer-readable storage medium of claim 15, wherein the computer-executable instructions further cause the one or more processing units to:

generate additional instructions for causing the LLM to:

select a subset of participants from the plurality of participants of the first meeting, the subset of participants selected in response to a detection of a threshold match between a role of the subset of participants and a topic identified from the meeting content, the topic associated with expressive illustrations that are received in association with a message or comment describing the topic, and generate a task description or a description of expressive illustrations received in association with the meeting content describing the topic;

include the task description or a description of expressive illustrations received in association with the meeting content describing the topic in an individual meeting summary;

configure permissions for the subset of participants to access the individual meeting summary; and communicate the individual meeting summary to the subset of participants associated with the role, while restricting other participants of the plurality of participants from accessing the individual meeting summary.

* * * * *